US012078171B2

(12) United States Patent
Rossi

(10) Patent No.: US 12,078,171 B2
(45) Date of Patent: Sep. 3, 2024

(54) SCREW ASSEMBLY FOR A TRIPLE SCREW PUMP AND TRIPLE SCREW PUMP COMPRISING SAID ASSEMBLY

(71) Applicant: Settima Meccanica S.r.l., Milan (IT)

(72) Inventor: Manuele Rossi, Ponte dell'Olio (IT)

(73) Assignee: Settima Meccanica S.r.l., Milan (IT)

( * ) Notice: Subject to any disclaimer, the term of this patent is extended or adjusted under 35 U.S.C. 154(b) by 0 days.

(21) Appl. No.: 18/278,352

(22) PCT Filed: Dec. 28, 2021

(86) PCT No.: PCT/EP2021/087714
§ 371 (c)(1),
(2) Date: Aug. 22, 2023

(87) PCT Pub. No.: WO2022/179746
PCT Pub. Date: Sep. 1, 2022

(65) Prior Publication Data

US 2024/0125322 A1 Apr. 18, 2024

(30) Foreign Application Priority Data

Feb. 23, 2021 (IT) ........................ 102021000004148

(51) Int. Cl.
*F04C 2/16* (2006.01)
*F04C 2/08* (2006.01)
*F04C 18/16* (2006.01)

(52) U.S. Cl.
CPC .............. *F04C 2/165* (2013.01); *F04C 2/084* (2013.01); *F04C 18/16* (2013.01); *F04C 18/165* (2013.01); *F04C 2240/20* (2013.01); *F05B 2240/30* (2013.01)

(58) Field of Classification Search
CPC .......... F04C 2/165; F04C 2/084; F04C 18/16; F04C 2240/20
See application file for complete search history.

(56) References Cited

U.S. PATENT DOCUMENTS 2,079,083 A * 5/1937 Montelius ................. G01F 3/10 73/261
2,588,888 A * 3/1952 Sennet .................... F04C 2/165 418/71
2,652,192 A 9/1953 Chilton
(Continued)

FOREIGN PATENT DOCUMENTS

CN 106121999 A 11/2016

OTHER PUBLICATIONS

International Search Report dated May 2, 2022, issued in connection with PCT/EP2021/087714.
(Continued)

*Primary Examiner* — Dominick L Plakkoottam
*Assistant Examiner* — Paul W Thiede
(74) *Attorney, Agent, or Firm* — Akerman LLP

(57) ABSTRACT

A screw assembly for a triple screw pump includes a central screw and at least one lateral screw, both provided with one or more helicoidal threads. The lateral screw is arranged to mesh with the central screw, with a lateral screw axis being parallel to a central screw axis. The distance between the axes of the central screw and the lateral screw is greater than the half and lower than 3/5 of a central screw external diameter.

15 Claims, 9 Drawing Sheets

(56) References Cited

U.S. PATENT DOCUMENTS

| | | | | |
|---|---|---|---|---|
| 2,802,238 | A * | 8/1957 | Colombo | B30B 11/243 366/85 |
| 3,814,557 | A * | 6/1974 | Volz | F04C 2/165 418/201.3 |
| 4,773,837 | A | 9/1988 | Shimomura et al. | |
| 7,232,297 | B2 * | 6/2007 | Beaven | F04C 2/084 418/197 |
| 2006/0216190 | A1 | 9/2006 | Beaven et al. | |
| 2010/0021332 | A1 | 1/2010 | Hashida | |

OTHER PUBLICATIONS

Written Opinion of the International Searching Authority dated May 2, 2022, issued in connection with PCT/EP2021/087714.

* cited by examiner

PRIOR ART

SCREW ASSEMBLY FOR A TRIPLE SCREW PUMP AND TRIPLE SCREW PUMP COMPRISING SAID ASSEMBLY

CROSS-REFERENCE TO RELATED APPLICATIONS

This application is a national phase of PCT/EP2021/087714, filed Dec. 28, 2021, and claims priority to Italian Patent Application No. 102021000004148, filed Feb. 23, 2021, the entire contents of both of which are hereby incorporated by reference.

FIELD OF APPLICATION

The present invention relates to a screw assembly for a volumetric gear pump, in particular for a triple screw pump. The invention also relates to a triple screw pump comprising the above screw assembly.

The invention finds useful application in the various industrial fields in which gear pumps, and in particular triple screw pumps, are traditionally used.

A typical field of use in which triple screw pumps are appreciated is that of the lifting systems, but they are also widely used in other fields for various applications: power hydraulics, lubrication, cooling, filtration, transfer. By way of non-limiting example, other industrial fields in which the triple screw pump is applied, in addition to that of the lifting systems, include oil & gas, chemical, naval, mobile, agri-food, power generation and alternative energy, paper industry, pharmaceutical industry.

PRIOR ART

The triple screw pump, designed by the Swedish engineer Carl Montelius in 1923, is a volumetric pump nowadays widely used in various industrial fields. In fact, it has remarkable overall efficiency, good reliability, reasonable price, low level of acoustic emissions and vibrations in the flow transmission.

The triple screw pump has a set of three screws, a central lead one and two lateral driven screws. The screws, preferably with two helicoidal threads, are mounted in parallel within a casing and mesh with each other, thus generating closed volumes between their body and the casing. The closed chambers that are thus formed are in a number that is directly proportional to the length of the screws—also called rotors—and inversely proportional to the pitch of the helicoidal threads. The closed chambers are occupied by the working fluid which, during the rotation of the screws, continuously moves forward from a suction port to a discharge port.

The profile of the set of three screws is designed so that only the drive screw delivers pressure. This screw, given the configuration of the pump, is not exposed to radial forces and thus gives the machine the good overall efficiency previously mentioned. As previously stated, the two driven screws are idle and guided by the pressurized fluid. The sole hindrances to their rotation are the viscous friction with the working fluid and the sliding friction with the central screw and with the casing within which they are contained. For this reason, wear of the screws flanks is almost null even after prolonged periods of work.

Almost a century after its birth, the triple screw pump still shows the characteristic appearance conceived by its creator, characterized by a typical ratio between the diameters of the front profiles of the central lead screw and of the lateral driven screws. Indicating $Ø_{li}$ and $Ø_{le}$ the lateral screw internal and external diameters, respectively, and $Ø_{ci}$ and $Ø_{c}$ the central screw internal and external diameters, respectively, the dimensions $Ø_{li}$:$Ø_{le}$:$Ø_{ci}$:$Ø_{ce}$ in fact follow the ratio 1:3:3:5, which is considered optimal since it would present the best possible ratio between the area occupied by the fluid and the solid area defined by the material of the screws.

In this ratio, it is noted that the lateral screw external diameter $Ø_{le}$ and the central screw internal diameter $Ø_{ci}$ are always strictly the same. The equality between these diameters is considered in the prior art as an absolute axiom, which the design of any triple screw pump is based on.

The circles identified by the aforementioned diameters represent the pitch diameters used to create the curves that constitute the ideal profiles—that is, the profiles before the changes generally adopted to eliminate sharp edges. The consideration behind this design choice is that two base cylinders of equal diameter, having equal tangential speed and rotating with opposite angular speeds, roll on each other without sliding, resulting in less heat or energy dispersion.

Moreover, a reduction in the lateral screw external diameter Øle with respect to the lateral screw internal diameter Øci, in addition to causing a rolling with sliding with consequent wear and loss of efficiency, would not bring any advantage since there would be a decrease in the empty cross-sectional area within which the working fluid is trapped, i.e. a decrease in the pump capacity. Conversely, the increase in the lateral screw external diameter $Ø_{le}$ with respect to the lateral screw internal diameter $Ø_{ci}$ seemed impossible in the prior art studies, since it leads to an interpenetration of the helicoidal profiles generated during the rotation of the screws.

Therefore, having chosen the above equal diameters, in the prior art the flank of the central screw and of the lateral screw is obtained by applying the epitrochoid equations, the epitrochoid being a roulette curve which is obtained by joining the points described in space from a fixed point at a distance p from the center of a circle of radius r by rolling said circle outside another circle of radius $r_b$. The epitrochoid defines the cross-sectional profile of the flanks of the respective screws; by moving forward along the rotational axis of the screw, the profile rotates continuously so as to define a helix.

The known parametric equations of the epitrochoid are the following:

$$x(\vartheta) = (R + r)\cos\vartheta - d\cos\left(\frac{R + r}{r}\vartheta\right)$$

$$y(\vartheta) = (R + r)\sin\vartheta - d\sin\left(\frac{R + r}{r}\vartheta\right)$$

The polar equation is instead the following:

$$r(\vartheta)^2 = (R + r)^2 - 2d(R + r)\cos\left(\frac{R}{r}\vartheta\right) + d^2$$

In FIG. 5, relating to the prior art, $R_1$ and $d_1$ indicate the parameters relating to the construction of the central screw flank, whereas $R_2$ and $d_2$ indicate the parameters relating to the construction of the lateral screw flank. For the considerations previously made, the base radius r is the same for both constructions. As it can be seen, specifically the radii $R_1$ and $R_2$ of the rotating circle are also equal to r for both constructions. Furthermore, in the construction of the central screw flank, the tracing point lies at the end of the radius $r_1$ of the rotating circle, and the resulting curve is called epicycloid.

Therefore, the only design parameter to be set remains the distance from the center of point $d_2$, that draws the lateral screw flank and that determines the central screw external diameter and the lateral screw internal one, respectively. The choice of this parameter aims at optimizing the capacity, i.e. the volume of the screw occupied by the fluid, without affecting the mechanical strength of the screws.

In concrete terms, the typical ratio 1:3:3:5 between the screw diameters is obtained by choosing a value of $d_2$ equal to 5/3 $d_l$, for example by choosing the following parameters:

$R_1=R_2=1.5$ $r=1.5$ $d_2=2.5$ (which generates the driven screw flank)

$d_1=1.5$ (which generates the lead screw, or drive screw, flank)

Since these profiles are homothetic, once this basic relationship has been created with a simple scale effect, it is possible to obtain profiles of any size.

It should be noted that the ideal profiles generated with the epitrochoid equations have sharp edges. Said edges are easily deformable. Possible deformations on the edges risk to promote noise and anomalous vibrations during the pump operation, or even to irreparably damage the pump itself. Moreover, the edges are difficult to make with tool precision, and the consequent shape errors that can be generated locally lead to unwanted difficulties in the screws meshing.

For the reasons mentioned above, in the prior art the ideal profiles are generally modified by beveling the aforementioned sharp edges, in particular on the driven screw which has sharper and potentially more critical edges. The bevel can be carried out in a simple manner by cutting the edge with a straight line, or in a more refined manner with circular arc or elliptical arc-shaped connecting profiles. The latter solution is the one that minimizes leaks or volumetric losses.

Obviously, by introducing the above-described geometric corrections, the perfect conjugation on the line of the screws flanks is lost, therefore it is necessary to completely recalculate the profile for both the driven and the drive screws.

Documents EP 1 655 491 A2, DE 10 2009 028004 A1 and EP 0 209 984 A1 disclose triple screw pumps according to the prior art.

It should be once again noted that the triple screw pump, as described in this chapter relating to the prior art, was born in the early 1900s, and that the screws' profile has remained substantially unchanged up to date. The improvements introduced so far have always involved structural or material changes.

On the other hand, there is always a need for improvements on such widespread machines, in particular with regard to the increase in capacity and the reduction of radial and axial dimensions.

The technical problem of the present invention is therefore that of providing a screw assembly and a corresponding triple screw pump with significantly greater flow rate than the prior art pumps of similar size.

SUMMARY OF THE INVENTION

The solution idea underlying the present invention is to provide a screw assembly and a corresponding triple screw pump by reviewing the traditional ratio 1:3:3:5 among the diameters $Ø_{li}:Ø_{le}:Ø_{ci}:Ø_{ce}$.

The applicant has in fact observed that it is possible to deviate, even substantially, from this ratio, which is considered in the prior art as the best possible compromise between pump capacity and mechanical resistance of the rotors.

The prior art ratio 1:3:3:5 defines a distance s' between the axes of the central screw and of the lateral screw equal to 3/5 of the central screw external diameter $Ø_{ce}$: the distance s' between the axes is in fact determined by the sum of the lateral screw external radius and the central screw internal radius. It was noted that a decrease in the ratio between the distance s' between the axes and the central screw external diameter $Ø_{ce}$ defines a greater useful area for trapping the working fluid, with the same diameter $Ø_{ce}$. Moreover, a smaller distance s' between the axes decreases the radial dimensions of the pump. Ideally, the distance s' between the axes may be reduced up to a value equal to half the central screw external diameter $Ø_{ce}$: however, said value cannot be concretely reached, since it would coincide with a null lateral screw internal diameter $Ø_{li}$.

On the other hand, in the prior art the use of ratios $s/Ø_{ce}$ lower than 3/5 has always been avoided for structural solidity reasons: in fact, as the ratio decreases, the lateral screw internal diameter $Ø_{li}$, i.e. the core which should ensure the mechanical resistance thereof, drastically decreases.

However, the applicant noted that the decrease in the lateral screw internal diameter $Ø_{li}$ can be compensated for by appropriately reducing the opening angle of the flank β in the lateral screws. Said opening angle is defined, on the cross-sectional profile of the screw, as the central angle subtended between the two intersection points of the epitrochoid which generates the profile with the pitch circle of the screw, straddling the hollow portion that can be filled by the working fluid. The opening angle of the tooth β on the lateral screws is uniquely related to the same opening angle of the tooth α on the central screw. The applicant has determined that the variation of said angles does not change the overall trapping area of the working fluid, i.e. the capacity is an invariant with respect to the choice of said angles. Thus, the opening angle of the flank β can be conveniently chosen in order to allow adequate mechanical strength of the screw, in particular by maintaining this angle preferably less than 90°.

Thanks to these observations, the ratio $s/Ø_{ce}$ was redefined, preferably comprised between 52% and 56%, and ideally equal to 54%.

The above exposed technical problem is thus solved by a screw assembly described herein and by a respective triple screw pump described herein.

The technical problem is thus solved by a screw assembly for a triple screw pump, comprising: a central screw and at least one lateral screw, both provided with one or more helicoidal threads, said lateral screw being arranged to mesh with said central screw with a lateral screw axis parallel to the central screw axis, wherein the distance between the axes of the central screw and of the lateral screw is greater than the half and lower than 3/5 of a central screw external diameter.

As above mentioned, the distance between the axes of the central screw and of the lateral screw is preferably comprised between 52% and 56% of the central screw external diameter, and more preferably equal to 54%.

The central screw external diameter is preferably greater than 5 times the lateral screw internal diameter, more preferably greater than 10 times the lateral screw internal diameter.

The lateral screw internal diameter is preferably comprised between 60% and 99% of the lateral screw external diameter, more preferably between 68% and 98%, even more preferably between 85% and 92%.

Preferably, the lateral screw internal diameter is smaller than the diameter of the respective pitch circle and the lateral screw external diameter is greater than the diameter of the respective pitch circle.

Preferably, the lateral screw external diameter is comprised between 1 time and 1.3 times the diameter of the respective pitch circle, more preferably it is comprised between 1 time and 1.2 times, even more preferably the lateral screw external diameter is equal to 1.1 times the diameter of the respective pitch circle.

The features and advantages of the gear wheel and of the apparatus of the present invention will become apparent from the following description of an embodiment thereof given by way of non-limiting example with reference to the appended drawings.

DETAILED DESCRIPTION

Figure 1:
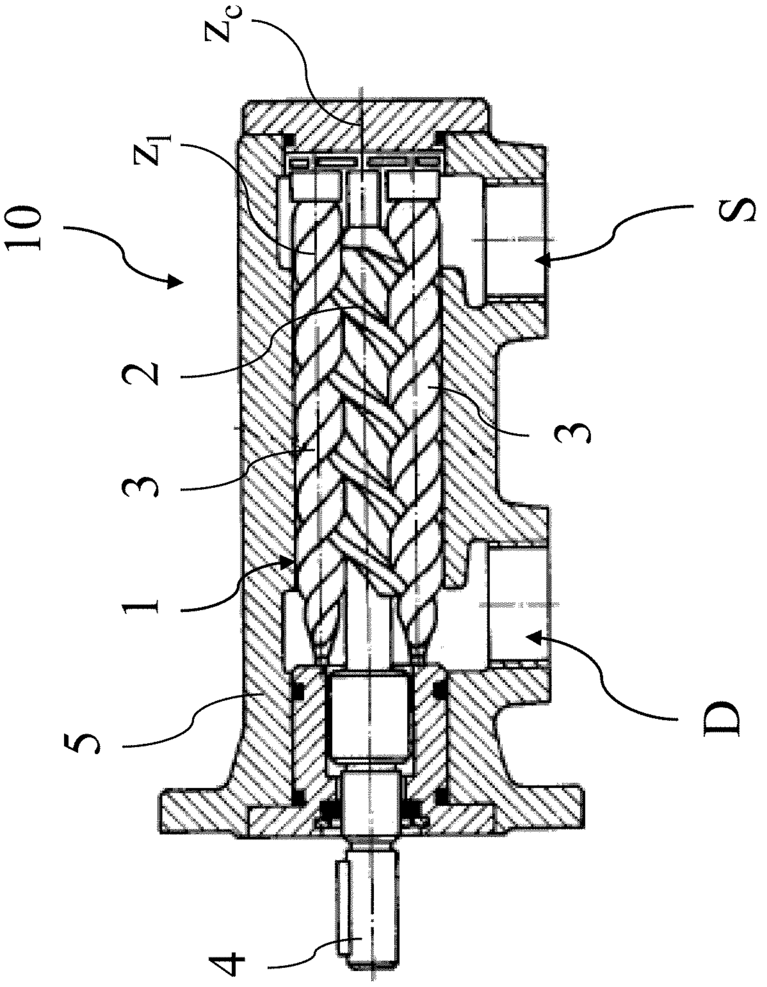
FIG. 1 schematically shows a triple screw pump which can feature the screw assembly according to the invention.
Figure 3:
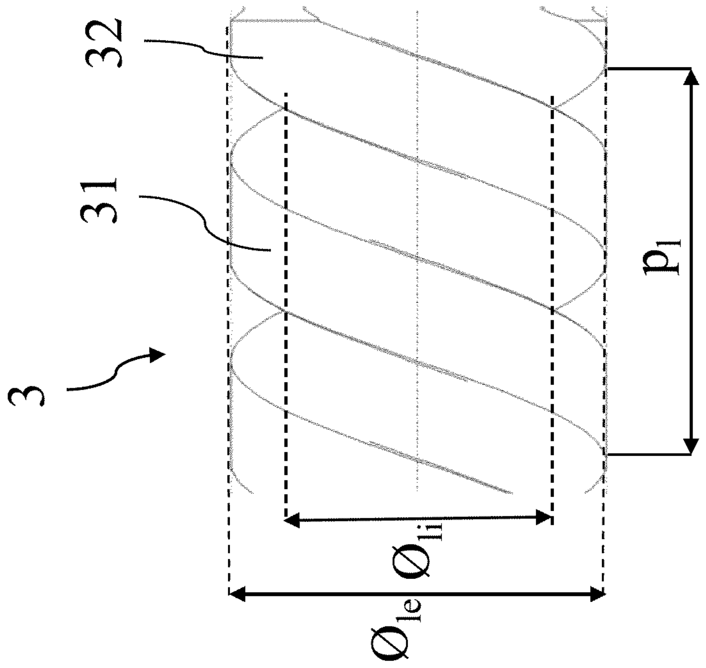
FIG. 3 schematically shows, in a side view, a portion of the central screw of the screw assembly according to the invention.
Figure 2:
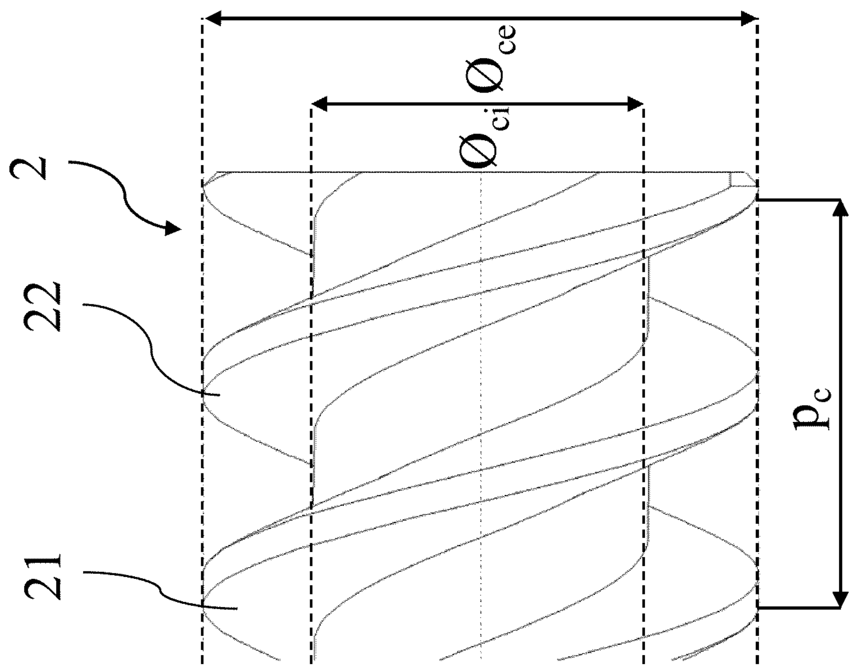
FIG. 2 schematically shows, in a side view, a portion of the central screw of the screw assembly according to the invention.

With reference to the above FIG. 1, a triple screw pump is globally indicated with reference number 10, whereas reference number 1 indicates the screw assembly 2, 3 assembled thereon. As previously described, the present invention specifically relates to the profiles 20, 30 of said screws 2, 3, which in FIGS. 10-13 faces a corresponding profile 20', 30' of the prior art. The new profiles 20, 30 define, in cross-section, a supplementary volume V in which the fluid to be pumped is trapped with respect to the corresponding profiles 20', 30' of the prior art.

It is worth noting that the figures represent schematic views and are not drawn to scale, but instead they are drawn so as to enhance the important features of the invention. Furthermore, in the figures, the different elements are shown schematically since their shape may vary according to the desired application. It is also worth noting that in the figures identical reference numbers refer to elements that are identical in shape or function.

Figure 4:
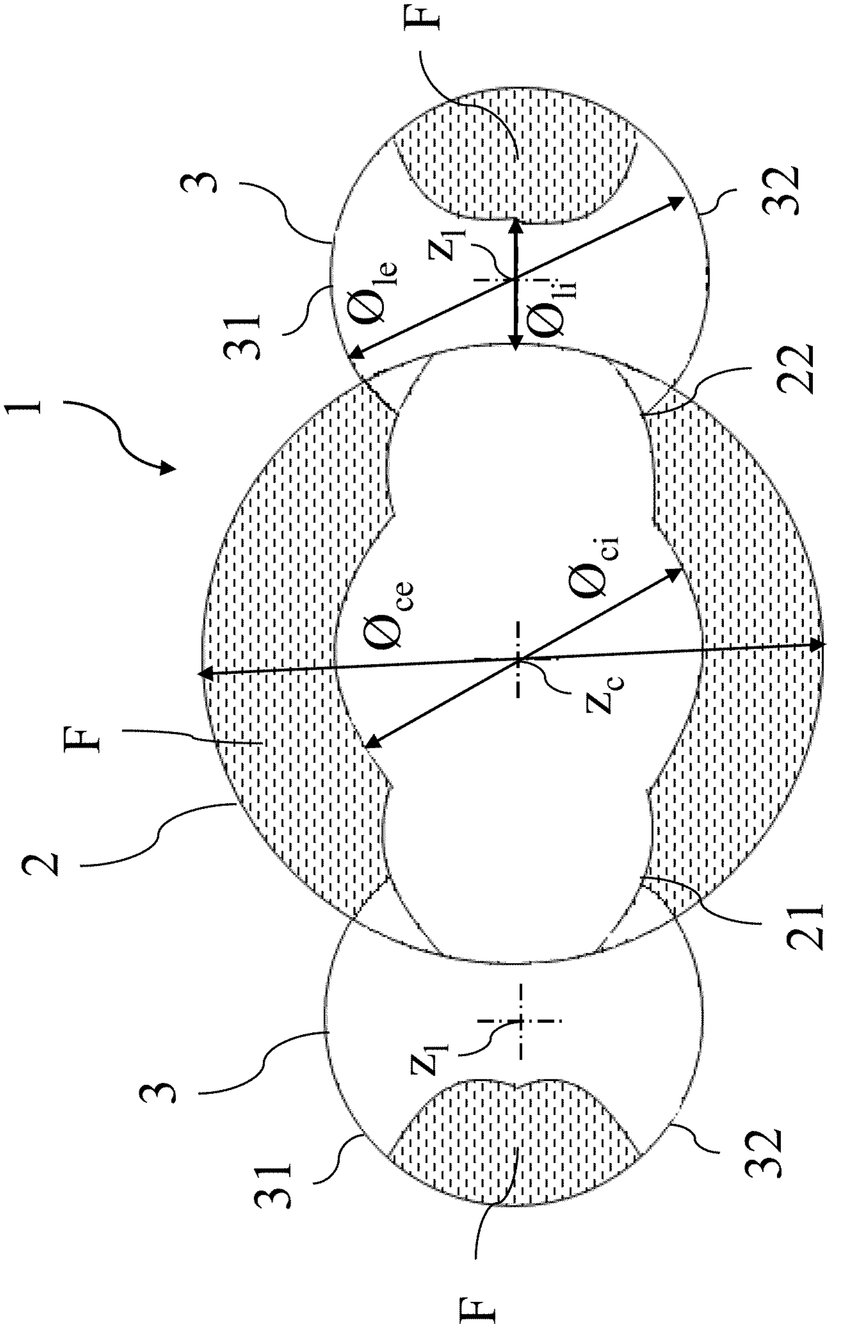
FIG. 4 shows a cross section of the screw assembly according to the present invention in an operational configuration, with the fluid trapping areas identified by meshed portions.

In a known manner, the triple screw pump 10 comprises a pump body 5 with a suction port S and a discharge port D. Within the pump body a screw assembly 1 is assembled with a lead central screw 2, integral with a driving shaft 4, and two driven lateral screws 3. The axes $z_l$ of the lateral screws 3 and the axis $z_c$ of the central screw 2 are parallel to each other and the screws mesh with each other. The rotation movement of the central screw 2 thus moves the two lateral screws 3 and carries a fluid F from the suction port S to the discharge port D in the spaces enclosed between the opposite threads, as illustrated in FIG. 4.

The central screw 2 has two threads 21, 22 with fixed pitch $p_c$; the lateral screws 3 also have two threads with pitch $p_l$ equal to that of the central screw 2.

The profile 20 of the central screw 2 thus has in cross-section two circular crest portions, joined to the cylindrical bottom by noticeably convex flanks.

The profile 30 of the lateral screw 3 also has in cross section two circular crest portions, joined to the cylindrical bottom by noticeably concave flanks.

It is noticed that, in a known manner, the two lateral screws 3 are equal to each other or have the same profile 30.

As above mentioned, the present invention relates to the specific shape of the profiles 20, 30 of the flanks of the screws 2, 3.

The preferred embodiment herein described shows a preferred shape of said profiles, showing how this is obtained from the prior art profiles.

Figure 5:
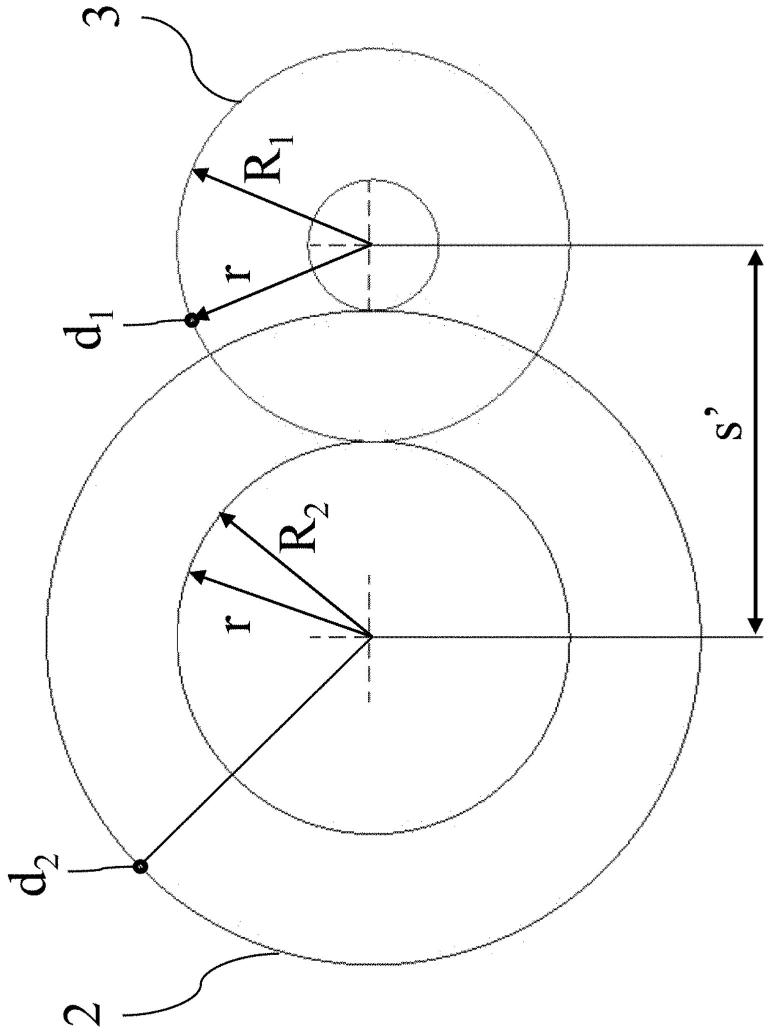
FIG. 5 shows a diagram relating to the generation of screw profiles in a triple screw pump of the prior art.

As described in the corresponding paragraph of the present disclosure, the prior art profiles are made from an equivalence condition between lateral screw internal diameter and lateral screw external diameter. Thus, as shown in FIG. 5, there is a distance s' between the axes equal to the lateral screw 2 internal diameter, i.e. to the lateral screw 3 external diameter. Moreover, in the prior art the lateral screw internal diameter is equal to 1/3 of the respective external diameter, and the central screw external diameter is equal to 5/3 of the internal diameter. Therefore, there is the typical ratio between diameters 1:3:3:5.

Figure 6:
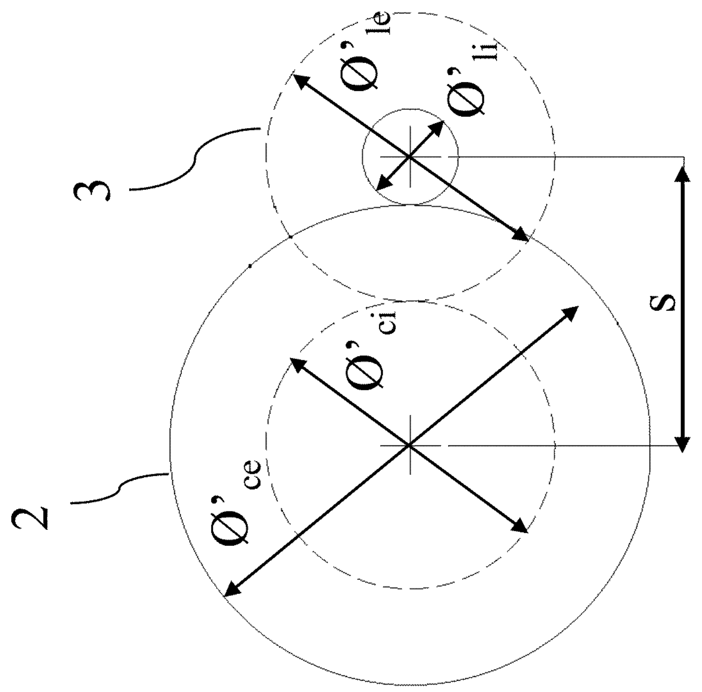
FIG. 6 shows a first step of a conceptual procedure for generating the flank profile in a screw assembly according to the present invention.

To obtain the new profiles, first of all the above mentioned ratio is modified, identifying a new parameterization that allows increasing the capacity of the pump without compromising the mechanical resistance of the screws. This new ratio between diameters $Ø'_{li}:Ø'_{le}:Ø'_{ci}:Ø'_{ce}$, illustrated in FIG. 6, is conveniently chosen as 0.4:2.7:2.7:5, and allows increasing the suction section by about 7%. Following the proposed parameterizations with respect to the diameters, with respect to the prior art the new distance s between the axes has thus been reduced from the value of 3 to the value of 2.7.

Starting from the new parameters, ideal profiles for the two screws are generated by using the epitrochoid equations as described in the prior art analysis. As previously described, the epitrochoid is the curve obtained by joining the points described in space from a fixed point at a certain distance from the center of a radius circle by rolling said circle outside another circle: the distance from the circle and the radius of the circles are determined in this case by the internal and external diameters chosen for the two screws. The epitrochoid is externally and internally joined to the circles defined by the internal and external diameters chosen for both screws, thus determining the ideal profiles visible in FIG. 7.

The other parameter to be determined is the starting point p, p', p" for the epitrochoid generation. Actually, the parameter that characterizes the screws is the angle α subtended by the chord that joins two successive starting points p', p" of the epitrochoids that generate the profile on the central screw 2: said value is uniquely linked to the corresponding angle β on the other screw 3. Said angles, hereinafter defined tooth opening angle α and flank opening angle β, define the length of the arc of circle that joins the flanks on the external profile of the central screw 2 and the length of the arc of circle between two successive teeth of the lateral screw 3. On the one hand they determine the cylindrical surface in sliding contact with the housing of the screws, on the other hand the mechanical strength of the helix defined on the screw. The applicant has determined, through geometric analyzes, that the useful volume for trapping the working fluid is an invariant with respect to the choice of the opening angles of the tooth α and of the flank β. For this reason, the angles may be selected at will just based on tribological and mechanical considerations, without impacting the capacity of the pump.

Figure 8:
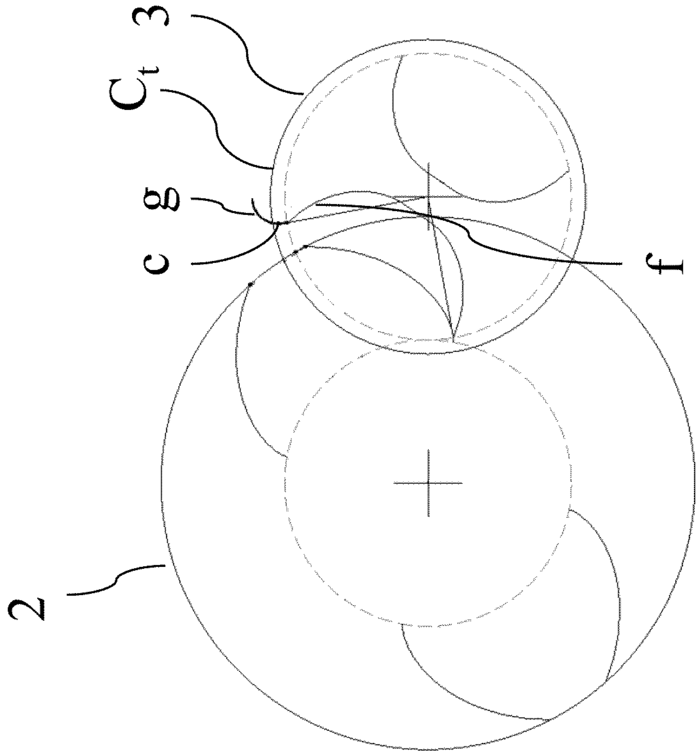
FIG. 8 shows a third step of a conceptual procedure for generating the flank profile in a screw assembly according to the present invention.
Figure 11:
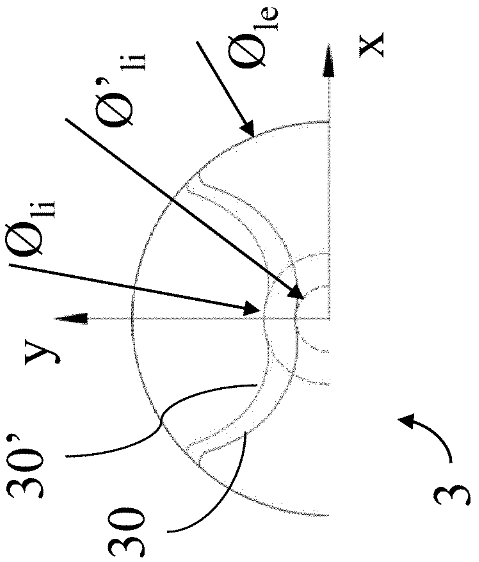
FIG. 11 compares the profile of a lateral screw according to the present invention with the profile of a lateral screw according to the prior art.
Figure 10:
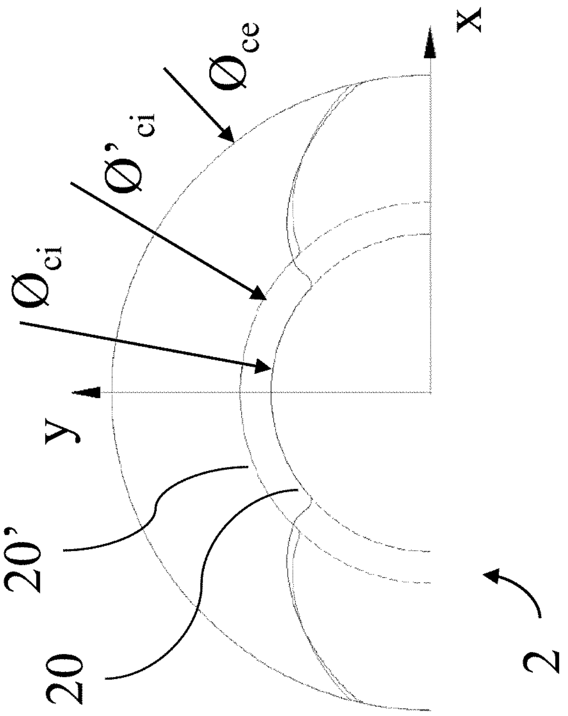
FIG. 10 compares the profile of a central screw according to the present invention with the profile of a central screw according to the prior art.

Then the application of an additional geometry g above the ideal profile of the driven lateral screw 3 is carried out. Said additional geometry g, represented in FIG. 8, develops outside the pitch diameter, and joins the flank f defined by the epitrochoid equation to a truncation circle $C_t$, of diameter greater than the lateral screw external diameter $Ø'_{le}$ previously set, i.e. of a diameter greater than the pitch circle diameter $C_{pl}$. The additional geometry g thus defines a face c of the screw profile, which joins to the flank in the previously identified point p. The connection point p between the face c defined by the epitrochoid and the flank f defined by the additional geometry will preferably be an inflexion point, not an angular point (wherein by angular point a non-differentiable point of the first kind is intended). The additional geometry g can be suitably selected according to the design choices, for example it can be an elliptical curve or a spline function.

Figure 9:
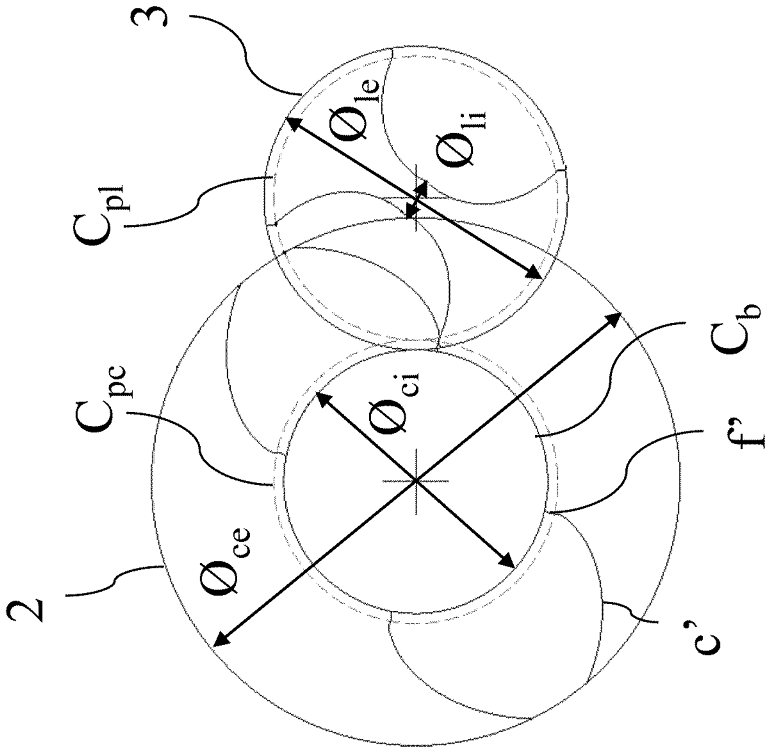
FIG. 9 shows a fourth step of a conceptual procedure for generating the flank profile in a screw assembly according to the present invention.

Once obtained the final profile of the lateral screw 3, the profile of the central screw 2 is obtained by interpolation. The two final profiles are illustrated in FIG. 9. As it may be noticed, at the base of face c' of the central screw 2 defined by the epitrochoid a connection flank f' to a new internal arc with respect to the pitch circle $C_{pc}$ develops. The redefinition of the profiles thus leads to a variation of the internal and external diameters of the two screws. In particular, the lateral screw internal diameter $Ø_{ci}$ is now smaller than the lateral screw external diameter $Ø_{le}$. The ratio between the final diameters $Ø_{li}$:$Ø_{le}$:$Ø_{ci}$:$Ø_{ce}$, by using the previous parametrization, is now 0.4:2.97:2.43:5.

Figure 7:
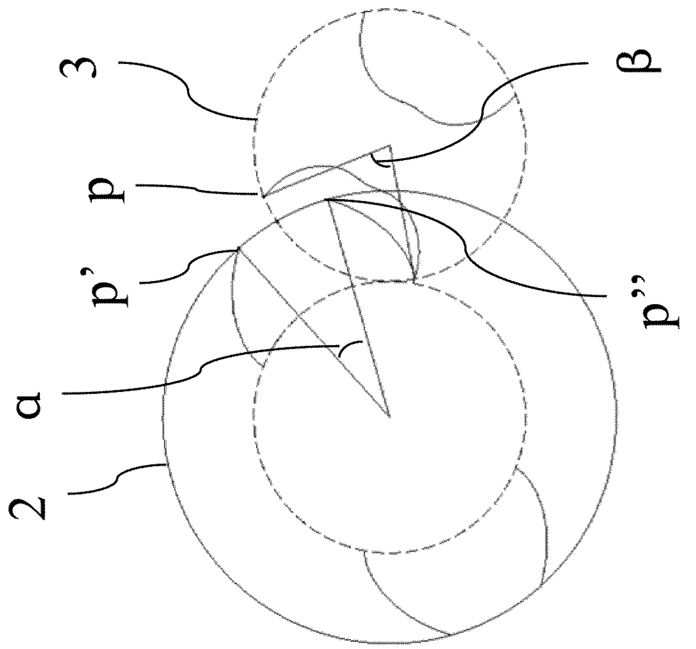
FIG. 7 shows a second step of a conceptual procedure for generating the flank profile in a screw assembly according to the present invention.

The modification made with respect to the ideal profiles illustrated in FIG. 7 leads to a further increase in the pump capacity for the same diameter of the screws equal to about 10%. The increase in the overall capacity compared to the prior art is therefore equal to about 17%. In addition, the radial dimensions of the pump decrease due to the reduction in the distance between the axes of the screws.

Figure 13:
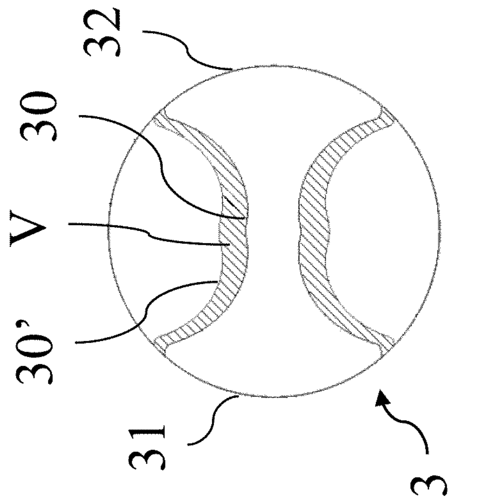
FIG. 13 compares the profile of a lateral screw according to the present invention with the profile of a lateral screw according to the prior art, with the supplementary fluid trapping area identified by a hatched portion.
Figure 12:
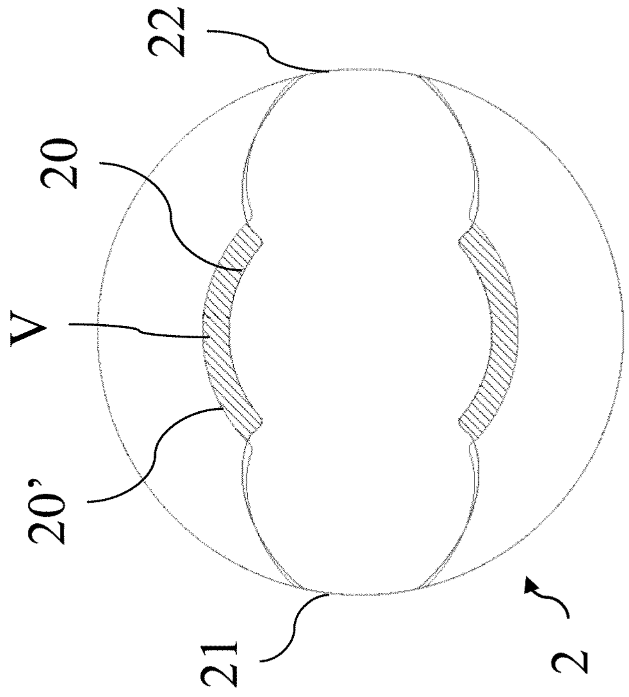
FIG. 12 compares the profile of a central screw according to the present invention with the profile of a central screw according to the prior art, with the supplementary fluid trapping area identified by a hatched portion.
Figure 14:
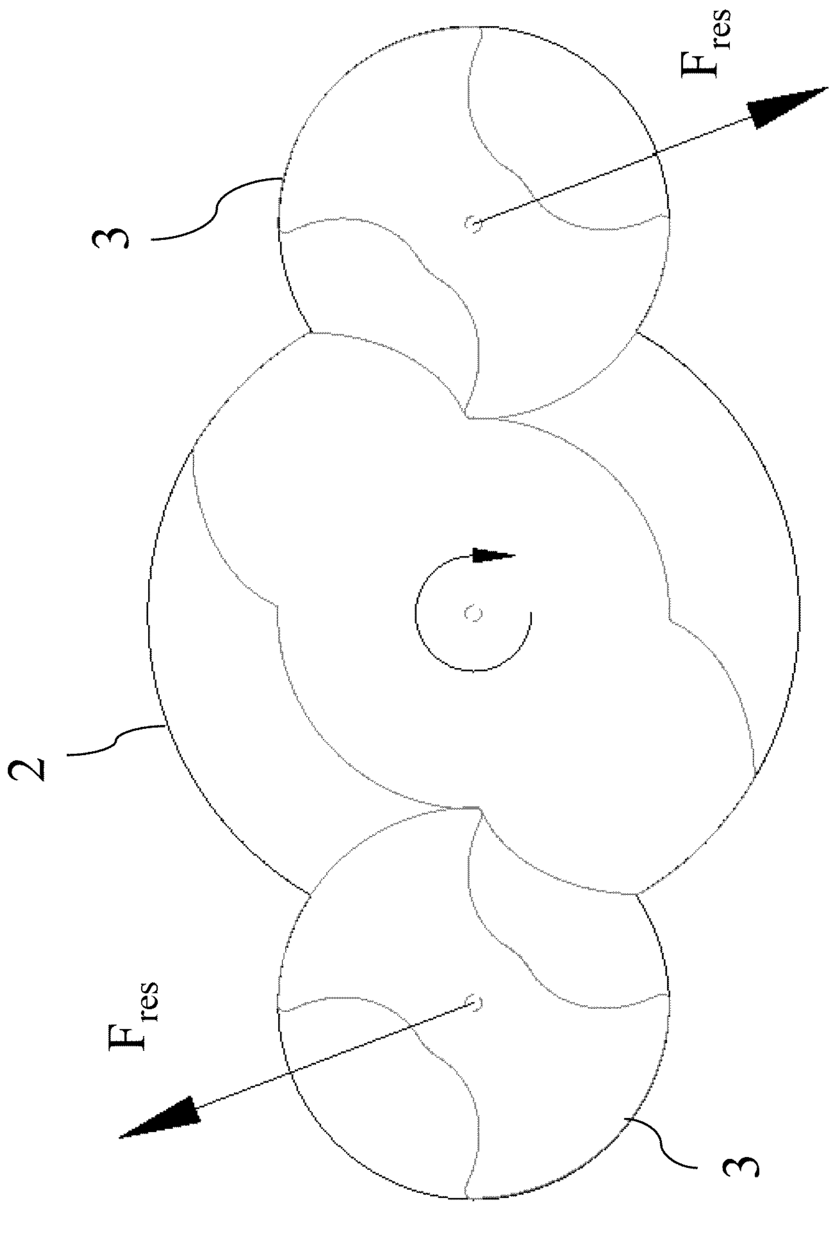
FIG. 14 illustrates the forces acting on the rotors driven in a generic triple screw pump.

The above described improvement can be clearly seen in FIGS. 12, 13; in fact, the hatched area represents an increase in the free frontal volume that can be occupied by the pumped fluid with a consequent capacity increase with the same external diameters of the screws.

An advantage of the pump according to the present invention results from the particularly compact dimensions, in particular in the radial direction, but also in the axial direction since with the same flow rate the pitch of the screws will be shorter.

A further advantage comes from the lower amount of material required for the construction of the pump, which results in limited production costs.

Other advantages of the pump according to the present invention relate to its performance features. In particular, the pump has the same volumetric efficiency but a better pressure ripple, a reduced noise, and a lower net positive suction head (NPSH).

Obviously, a skilled person can make several changes and variants to the above described gear wheel and the apparatus, in order to meet contingent and specific needs, all of them by the way contained in the scope of protection of the invention as defined by the following.

What is claimed is:

1. A screw assembly for a triple screw pump, comprising:

a central screw and two lateral screws, all of the screws being provided with one or more helicoidal threads, each lateral screw being arranged to mesh with said central screw, and a lateral screw axis of at least one of the two lateral screws being parallel to a central screw axis, wherein a distance between the central screw axis and the lateral screw axis is greater than 1/2 and lower than 3/5 of a central screw external diameter, the distance being transverse to the respective central screw axis and the lateral screw axis.

2. The screw assembly according to claim 1, wherein the distance between the central screw axis and the lateral screw axis is comprised between 52% and 56% of the central screw external diameter.

3. The screw assembly according to claim 2, wherein the distance between the central screw axis and the lateral screw axis is substantially equal to 54% of the central screw external diameter.

4. The screw assembly according to claim 1, wherein the central screw external diameter is greater than 5 times a lateral screw's internal diameter.

5. The screw assembly according to claim 1, wherein the central screw external diameter is greater than a lateral screw's external diameter, a central screw internal diameter being lower than the lateral screw's external diameter.

6. The screw assembly according to claim 5, wherein the central screw internal diameter is comprised between 60% and 99% of the lateral screw's external diameter.

7. The screw assembly according to claim 6, wherein the central screw internal diameter is comprised between 85% and 92% of the lateral screw's external diameter.

8. The screw assembly according to claim 1, wherein the central screw internal diameter is smaller than a diameter of a respective pitch circle and a lateral screw's external diameter is greater than a diameter of a respective pitch circle.

9. The screw assembly according to claim 8, wherein a lateral screw's external diameter is comprised between 1 time and 1.3 times a diameter of a respective pitch circle.

10. The screw assembly according to claim 1, wherein a cross-sectional profile of the lateral screws has a flank which follows an epitrochoid, said flank being joined to a truncation circle by a face.

11. The screw assembly according to claim 10, wherein the flank and the face connect in an inflexion point on a cross-sectional profile of the lateral screws.

12. The screw assembly according to claim 10, wherein said face of the lateral screws is curvilinear and joined to the flank and the truncation circle without angular points (non-differentiable point of the first kind).

13. The screw assembly according to claim 1, wherein the lateral screws have a same profile and are configured to mesh at two sides of the central screw.

14. The screw assembly according to claim 13, wherein the central screw comprises a first thread and a second thread having an equal pitch, and both lateral screws comprise a first thread and a second thread having an equal pitch, the pitch of the central screw threads being equal to the pitch of the lateral screw threads.

15. A triple screw pump comprising a pump body, a suction port, a discharge port and a screw assembly according to claim 13, wherein the central screw and the lateral screws are arranged in a rotating manner, wherein the mesh of each lateral screw with said central screw is within the pump body, a rotation of said central and lateral screws moving a fluid from the suction port to the discharge port.

* * * * *